United States Patent [19]
Hardy

[11] 3,762,060
[45] Oct. 2, 1973

[54] LAYOUT FIXTURE

[76] Inventor: Peter S. Hardy, c/o Peerless Aluminum Foundry Co., Inc., 55 Andover St., Trumbull, Conn.

[22] Filed: June 23, 1971

[21] Appl. No.: 155,780

[52] U.S. Cl. ............................. 33/174 TD, 269/71
[51] Int. Cl. ....................... F16m 11/12, G01b 5/14
[58] Field of Search ............... 33/174 TA, 174 TB, 33/174 TC, 174 TD; 269/55, 56, 58, 59, 61, 71, 74, 76, 81

[56] References Cited
UNITED STATES PATENTS 2,477,169  7/1949  Brekelbaum ..................... 269/61
2,483,811  10/1949  Cullen ............................. 269/71

*Primary Examiner*—Robert B. Hull
*Assistant Examiner*—Richard R. Stearns
*Attorney*—Mattern, Ware & Davis

[57] ABSTRACT

A layout fixture capable of supporting workpieces weighing up to two tons and easily maneuvering and indexing the workpiece about two mutually perpendicular axes of rotation while also controlling both vertical and lateral translation. The workpiece is supported above a measuring table and can be moved at least halfway across the table to facilitate the layout and checking of the workpiece.

12 Claims, 4 Drawing Figures

INVENTOR.
PETER S. HARDY

BY

MATTERN WARE AND DAVIS
ATTORNEYS

LAYOUT FIXTURE

SUMMARY OF THE INVENTION

The present invention relates to a layout fixture and more particularly to the type for laying out, checking and measuring large workpieces which are heavy and difficult to manipulate, such as castings, models, machined parts, and the like, having intricate surfaces of varying form disposed in precise angular relationships.

Existing layout fixtures are too small to handle the weight of large workpieces and, consequently, such workpieces must be manually positioned and repositioned for checking of various angular relationships. The workpiece must be set on a work table, generally with the aid of heavy load moving equipment, properly leveled, and then checked. Only a limited number of angular relationships can be checked in one position, and when the relationships have been recorded, the workpiece must be repositioned, releveled and the new relationship checked. Before a workpiece has been completely laid out, checked or measured, several repositioning and releveling operations have to be performed. This not only makes the layout and checking operation extremely time-consuming, but also requires the repeated use of several persons and expensive moving equipment to maneuver the heavy workpiece. As a result, the performance of these operations on a workpiece becomes extremely expensive.

OBJECTS OF THE INVENTION

Therefore, an object of this invention is to provide a layout fixture which is capable of supporting large and heavy workpieces.

Another object of this invention is to provide a layout fixture of the above character which is easily maneuverable by a single person.

Another object of this invention is to provide a layout fixture of the above character capable of accurate angular positioning of the workpiece with respect to two intersecting axes of rotation disposed at right angles to each other.

A further object of this invention is to provide a layout fixture of the above character having index calibration scales in relation to the two axes of rotation and adjustment means for precisely coordinating zero markings on the two scales with each other and with a work table.

Another object of this invention is to provide a layout fixture of the above character having conveniently accessible, easily operable means for adjusting the planar position of the workpiece both above and along the work table as desired and positively fixing this adjusted position of the workpiece.

Another object of this invention is to provide a layout fixture of the above character adapted to rigidly hold all workpieces in a fixed position while permitting the work supporting platform and the workpiece to be moved in an inverted or rotated position in precise relationship to an established reference point.

A still further object of this invention is to provide a layout fixture of the above character which substantially reduces the time required in performing desired operations on a particular workpiece while substantially increasing the ease of handling the workpiece and performing these operations.

Other objects of the invention will in part be obvious and will in part appear hereinafter.

GENERAL DESCRIPTION

This invention employs the ordinary flat-bed work table on which the workpiece would be positioned, measured, repositioned, remeasured, etc., and incorporates two horizontally disposed parallel tracks along the two sides of the work table. Roller housings are mounted on both tracks and provided with clamping means for maintaining the roller housing in any desired position along the tracks. Each roller housing comprises a helical shaft, perpendicularly disposed to the track, and a control wheel and locking means for securely positioning the helical shaft in any desired location. The control wheels of each roller housing are interconnected to assure simultaneous movement of both helical shafts.

The helical shafts of the roller housing are connected to the workpiece platform assembly. The workpiece platform assembly comprises a workpiece platform and position controlling means capable of rotating the platform about its central axis. The platform and its associated rotational control equipment are fixedly mounted on a supporting shaft. The shaft is in turn supported at both ends by a housing, with each housing incorporating a pair of bracing struts which are journaled in the roller housing, which aid in supporting and maintaining the platform supporting struts in a substantially horizontal orientation above the work table. One of the shaft support housings is adapted to rotate the platform supporting shaft about its central axis and secure the shaft in any desired position.

The invention accordingly comprises the features of construction, combinations of elements, and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings, in which.

The same reference numbers refer to the same elements throughout the several views of the drawings.

DETAILED DESCRIPTION

Figure 1:
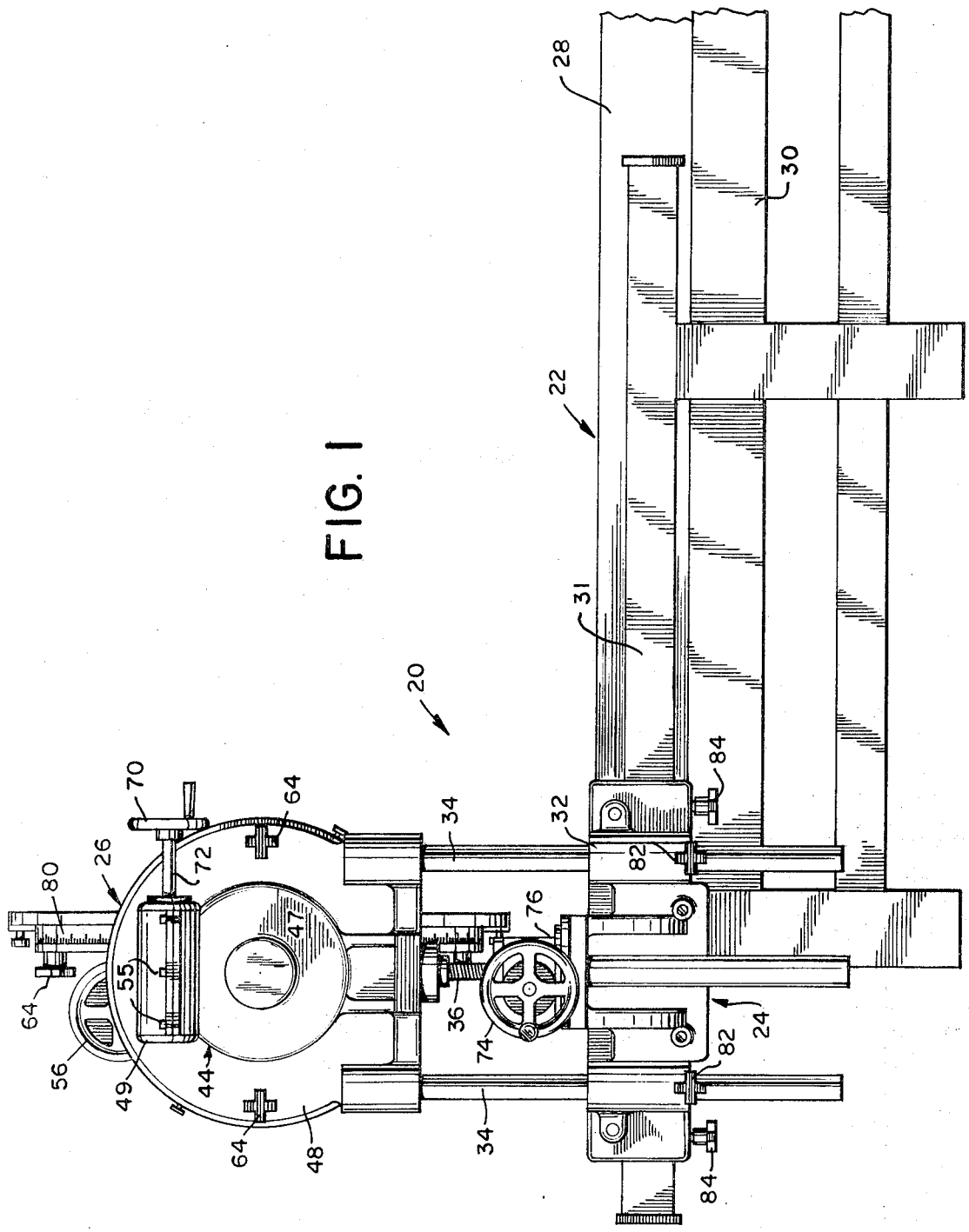
FIG. 1 is a side elevation view of the layout fixture of this invention.

Referring to FIG. 1, layout fixture 20 generally comprises a work table 22, a translation-adjustable support assembly 24, and a rotation-adjustable support assembly 26. Work table 22 comprises a conventional flat bed measuring block 28 supported by frame 30. A horizontally disposed track 31 is mounted along both sides and secured to measuring block 28.

Figure 2:
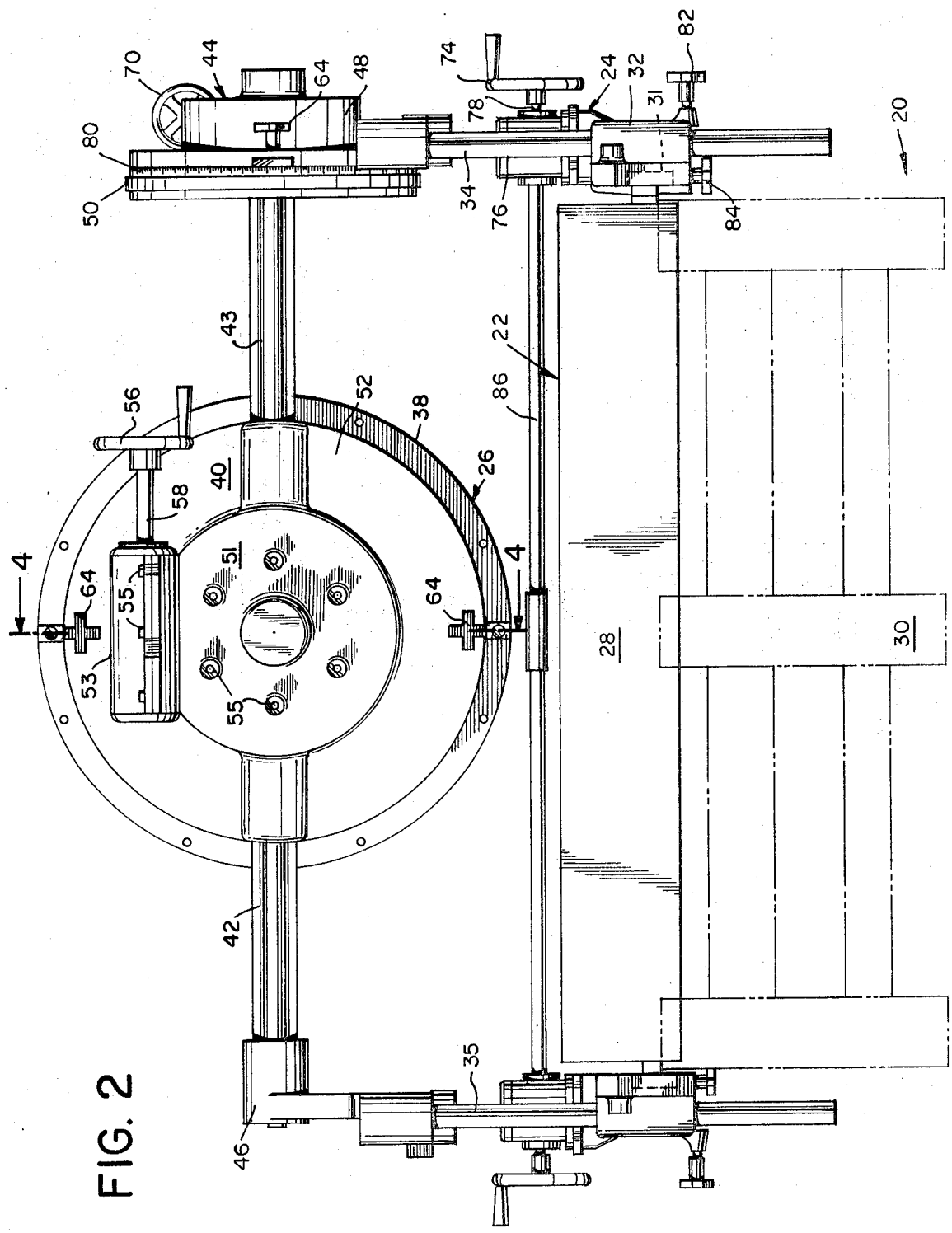
FIG. 2 is a front elevation view of the apparatus of FIG. 1.
Figure 3:
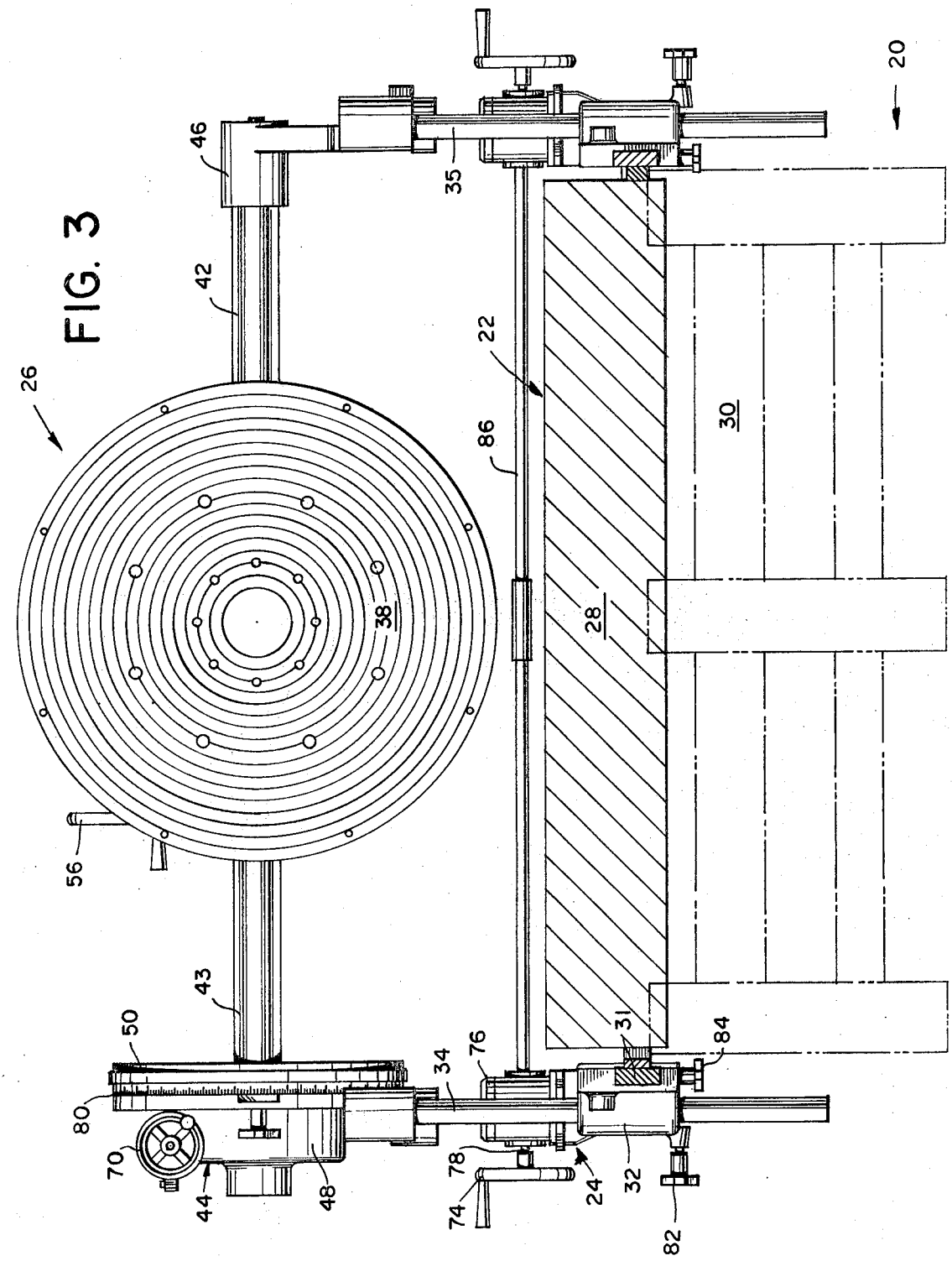
FIG. 3 is a rear view of the layout fixture of this invention taken along line 3—3 of FIG. 1.

In FIGS. 1, 2 and 3, the rotation-adjustable support assembly 26 can best be seen. Support assembly 26 comprises a workpiece platform 38, a platform-rotation housing 40, supporting shafts 42 and 43, shaft-rotation housing 44, and support bracket 46. One end of supporting shaft 42 is rotatably journaled in bracket 46, while its other end is mounted in housing 40. Similarly, one end of supporting shaft 43 is mounted in housing 40, while its other end is fixedly mounted in housing 44. Platform 38 incorporates a plurality of holes, as is known in the art, to allow a workpiece of any size or shape to be securely bolted thereto.

Figure 4:
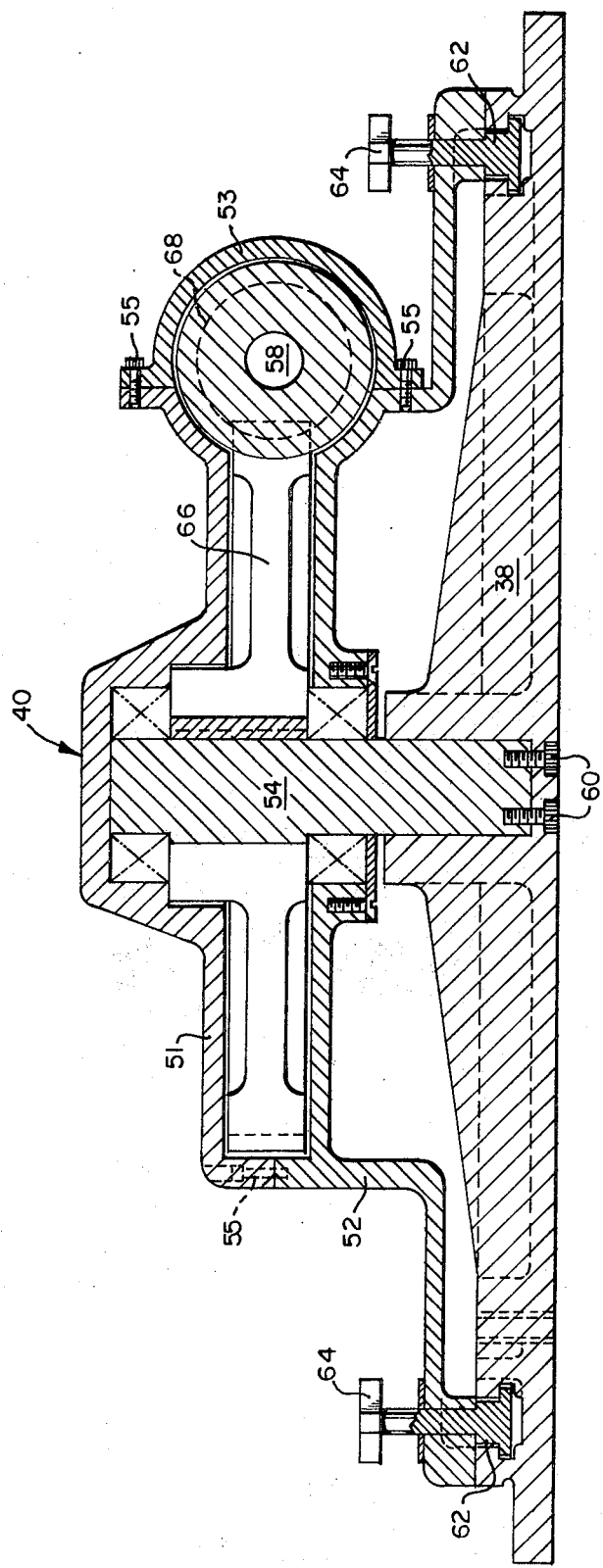
FIG. 4 is a cross-sectional view of the platform rotation housing of this invention taken along line 4—4 of FIG. 2.

Platform-rotation housing 40, best seen in FIGS. 2 and 4, comprises an upper casting 51, a lower casting 52, and a gear cover 53, all of which are integrally connected and supported by shafts 42 and 43. Incorporated within housing 40 is a gear assembly for rotating platform 38. The gear assembly comprises a shaft 54, which is rotatably journaled in casting 52, with platform 38 fixedly mounted to one end of shaft 54 by means of bolts 60. Platform 38 is also supported in its position adjacent to lower casting 52 by means of locking arms 62. Handles 64, threadedly engaged with arms 62, release the arms from the platform-locked position, shown in FIG. 4, to a position that allows platform 38 to be rotated about the central axis of shaft 54. When platform 38 has been rotated to its desired position, handles 64 are returned to the locked position. Circular gear 66 is keyed to shaft 54 and engaged with worm gear 68 which is keyed to shaft 58. By rotating handle 56, which is mounted to shaft 58 (FIG. 2), shaft 58 is rotated along with worm gear 68, circular gear 66, shaft 54, and platform 38, to any desired position.

The shaft-rotation housing 44, best seen in FIGS. 1 and 3, is constructed in a manner similar to housing 40 with a similar gear arrangement contained therein. Housing 44 comprises a main casting 48, a cove plate 47, and a gear cover 49, all of which are integrally connected by screws 55 and supported by struts 34. As with the gear arrangement contained within housing 40, the rotation of handle 70, which is fixedly mounted to shaft 72, causes shaft 72 to rotate and, in turn, through the gear arrangement, causes base plate 50 and shaft 43 to rotate about their common central axis. The gears are constructed as described above so that the simple effortless rotation of handle 56 and handle 70 causes workpiece platform 38 to rotate about two mutually perpendicular axis. Consequently, this construction allows any heavy, cumbersome workpiece which has been securely mounted to platform 38, to be easily manipulated by a single individual to any position falling within the sphere defined by the rotation about the two mutually perpendicular axes.

Furthermore, housing 44 incorporates locking handls 64, as previously described, to assure that the workpiece mounted to platform 38 is securely locked and maintained in any desired position. For additional convenience and to provide exact repeatable measurements, both platform-rotation housing 40 and shaft-rotation housing 44 incorporate adjustable indexing scales 80. Once these scales are properly set and locked, the workpiece platform can be repeatably rotated to any position about the two mutually perpendicular axes with accuracy.

The translation-adjustable support assembly 24, best seen in FIGS. 1, 2 and 3, comprises a roller housing 32, supporting struts 34 and 35, slidably journaled in housing 32, and a helical screw adjusting shaft 36. One end of each of the supporting struts 34 is fixedly mounted in main casting 48 of shaft-rotation housing 44, while slidably journaled in housing 32. Similarly, one end of each of the shafts 35 is fixedly mounted in bracket 46, while slidably journaled in housing 32. Locking handles 82 are threadedly engaged with housing 32 and serve as position brakes for shafts 34 and 35.

Roller housings 32 are slidably engaged with track 31, with locking handles 84 serving as position brakes. Once handles 84 have been released, roller housings 32 along with rotation-adjustable support assembly 26 is easily and effortlessly moved to any desired position along track 31. This allows any workpiece mounted on platform 38 to be easily moved to any desired position along measuring block 28.

Vertical adjustment of the entire rotation-adjustable support assembly 26 is made by means of helical shafts 36, handles 74, and the cooperating gears contained in housing 76. Handle 74, fixedly mounted to shaft 78, controls the rotation of a worm gear within housing 76, which cooperates with helical shaft 36. Connecting rod 86 interconnects the worm gears of housings 76 with each other. By rotating handle 74, helical shafts 36 are vertically raised or lowered. Since one end of each helical shaft 36 is journaled either in main casting 48 of shaft-rotation housing 44 or supporting bracket 46, the vertical movement of shafts 36 causes the entire rotation-adjustable support assembly 26 to be accordingly raised and lowered while supporting struts 34 and 35 slide within housing 32. Connecting rod 86 provides assurance that the movement of support assembly 26 will always be parallel to measuring block 28. Consequently, translation-adjustable support assembly 24 provides vertical and lateral translation of the entire rotation-adjustable support assembly 26 and any work piece mounted thereon. This vertical and lateral translation is easily achieved by a single individual with a minimum of effort regardless of the weight and cumbersomeness of the workpiece mounted to platform 38.

The prior art systems required continuous movement and reorientation of the workpiece on the measuring block to obtain all of the measurements required for a complete layout or inspection. With the dual translation and the dual axial rotation provided by the apparatus of this invention, complete layout and inspection measurements are easily and quickly taken by a single individual on large, heavy, cumbersome workpieces weighing up to 2,000 pounds.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A layout fixture comprising:
   a. a pair of track engaging housings adapted for lateral translation respectively along a pair of parallel tracks;
   b. a pair of strut members in parallel spaced relationship supported respectively in each of said housings and adapted for adjustable vertical movement;

c. a support shaft rotatably mounted to said strut members having an axis of rotation perpendicular to the plane of movement of each of said strut members; and d. a workpiece-securing platform rotatably mounted to said support shaft, having an axis of rotation perpendicular to the axis of rotation of said support rod.

2. Apparatus as defined in claim 1, further comprising:

e. a shaft-rotation assembly supportingly mounted to said strut members and adapted for rotating said support shaft.

3. Apparatus as defined in claim 2, wherein said shaft-rotation assembly is further defined as comprising:

a. a bracket mounted to one of said strut members with one end of said support shaft rotatably journaled therein; and b. a rotary drive housing mounted to the other of said strut members with one end of said support shaft journaled in said rotary drive housing and adapted for adjustable rotation of said support shaft about its central axis.

4. Apparatus as defined in claim 3, wherein said rotary drive housing incorporates clamping means, thereby maintaining said support shaft in a desired position.

5. Apparatus as defined in claim 3, wherein said rotary drive housing incorporates an adjustable indexing scale, thereby providing accurate repositioning of a desired position of said support shaft.

6. Apparatus as defined in claim 1, wherein said vertical adjustment of said strut members can be made at either end of said support shaft by means of a vertically disposed helical shaft cooperating with a gear arrangement driven by either of a pair of rotatable adjusting handles, whereby rotation of either of said adjusting handles causes the helical shaft to move vertically upward or downward which in turn causes the support shaft and workpiece platform to move therewith.

7. Apparatus as defined in claim 6, wherein a motion-translating rod interconnects said vertical adjusting handles, thereby maintaining the strut elements at the same height.

8. Apparatus as defined in claim 1, further comprising:

e. a measuring table; and f. two tracks longitudinally disposed along opposed sides of said table, whereby movement of said track-engaging housing along said track allows the layout fixture to move to any position along said table.

9. Apparatus as defined in claim 8, wherein said track-engaging housings incorporate clamping means for securing said layout fixture in a desired position along said track.

10. Apparatus as defined in claim 1, further comprising:

e. a workpiece platform rotary drive housing connected to said workpiece platform and adapted to rotate said platform about the axis perpendicular to the surface of the platform and passing through its midpoint.

11. Apparatus as defined in claim 10, wherein said platform rotary drive housing incorporates clamping means for maintaining said platform in a desired position about its axis.

12. Apparatus as defined in claim 10, wherein said platform rotary drive housing incorporates an adjustable indexing scale, thereby providing accurate repositioning of a desired position of said platform.

* * * * *